United States Patent [19]

Baumann

[11] 4,212,801
[45] Jul. 15, 1980

[54] UNSYMMETRICAL 1:2-CHROMIUM COMPLEXES CONTAINING AN AZO AND AN AZOMETHINE BOND

[75] Inventor: Hans Baumann, Wachenheim, Fed. Rep. of Germany

[73] Assignee: BASF Aktiengesellschaft, Fed. Rep. of Germany

[21] Appl. No.: 780,669

[22] Filed: Mar. 23, 1977

[30] Foreign Application Priority Data

Apr. 20, 1976 [DE] Fed. Rep. of Germany ....... 2614201

[51] Int. Cl.$^2$ ..................... C09B 45/06; C09B 45/16; C09B 45/26; D06P 1/10
[52] U.S. Cl. ........................... 260/145 A; 260/145 B; 260/146 R; 260/146 D; 260/147; 260/148; 260/149; 260/150; 260/151; 260/438.5 R
[58] Field of Search .................. 260/145 A, 149, 150, 260/151, 145 B, 146 R, 146 D, 147, 438.5 R

[56] References Cited

U.S. PATENT DOCUMENTS

| | | | |
|---|---|---|---|
| 3,391,132 | 7/1968 | Beffa et al. | 260/145 A |
| 3,987,023 | 10/1976 | McGeachie et al. | 260/149 X |
| 4,033,942 | 7/1977 | Beffa et al. | 260/145 A |
| 4,052,374 | 10/1977 | Baumann | 260/145 A |

Primary Examiner—Floyd D. Higel
Attorney, Agent, or Firm—Keil & Witherspoon

[57] ABSTRACT

2:1-chromium complex dyes of the formula:

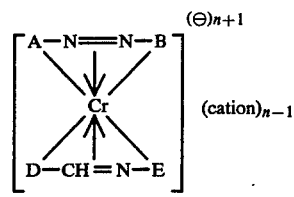

in which:
A is the radical of a carbocyclic diazo component with a complex-forming hydroxy or carboxy group adjacent to the azo bridge;
B is the radical of a carbocyclic, heterocyclic or open-chain coupling component with a complex-forming hydroxy or amino group adjacent to the azo bridge;
D is the radical of a carbocyclic aldehyde with a complex-forming hydroxy group adjacent to the azomethine bond;
E is an aliphatic radical with a complex-forming amino group; and n is the number of carboxy groups not participating in the formation of the complex and the sulfonic acid groups.

The dyes are eminently suitable for dyeing natural and synthetic polyamides, clear shades with good fastness properties being obtained.

5 Claims, No Drawings

UNSYMMETRICAL 1:2-CHROMIUM COMPLEXES CONTAINING AN AZO AND AN AZOMETHINE BOND

The invention relates to 1:2-chromium complexes which correspond to the formula:

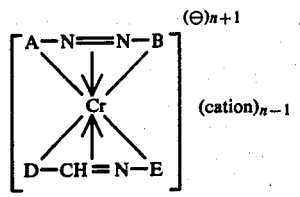     (I)

in which

A is the radical of a carbocyclic diazo component with a complex-forming hydroxy group or carboxy group in the adjacent position to the azo bridge;

B is the radical of a carbocyclic, heterocyclic or open-chain coupling component with a complex-forming hydroxy group or amino group in the adjacent position to the azo bridge;

D is the radical of a carbocyclic aldehyde with a complex-forming hydroxy group in the adjacent position to the azomethine bond;

E is an aliphatic radical with a complex-forming amino group; and n is the number of carboxyl groups not participating in the complex formation and the sulfonic acid groups.

The radicals E have the formula:

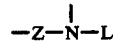

in which Z is an aliphatic radical optionally bearing aryl as a substituent and L is alkyl, cycloalkyl, aralkyl or aryl which may bear hydroxy, ether or ester groups, halogen or hydroxysulfonyl as a substituent.

The radicals Z preferably have two to ten carbon atoms and the radicals L preferably have one to eight carbon atoms.

Examples of suitable cations for the complexes are: alkali, ammonium or substituted ammonium cations such as sodium, potassium, ammonium, trimethylammonium, tributylammonium, dimethyldibenzylammonium, di-$\beta$-hydroxyethylammonium, $\beta$-ethylhexylammonium, $\gamma$-($\beta$-ethylhexoxy)-propylammonium or isopropoxypropylammonium.

The invention relates particularly to dyes of the formula (Ia):

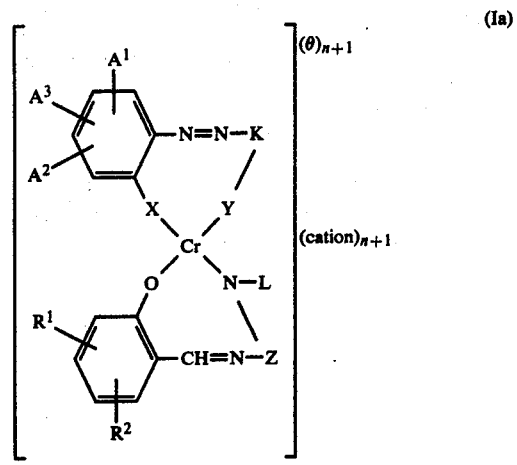

in which $A^1$ is hydrogen, hydroxysulfonyl, chloro, bromo, methyl, methoxy, ethoxy, nitro, methylsulfonyl, ethylsulfonyl, sulfamoyl, sulfamoyl bearing one or two $C_1$ to $C_4$ alkyl substituents on nitrogen, or N-phenylsulfamoyl;

$A^2$ is hydrogen, chloro, nitro or hydroxysulfonyl;

$A^3$ is hydrogen;

$A^1$ and $A^3$ together may form a condensed benzene ring which may bear nitro as a substituent;

$R^1$ is hydrogen, chloro, bromo, nitro, hydroxysulfonyl, phenylazo, phenylazo bearing chloro, bromo, methyl, methoxy, ethoxy, nitro or hydroxysulfonyl as a substituent or naphthylazo bearing hydroxysulfonyl as a substituent;

$R^2$ is hydrogen, chloro, bromo or nitro;

$R^1$ and $R^2$ may together form a condensed benzene ring;

X is —O— or —COO—;

Y is —O— or —NH—;

K is

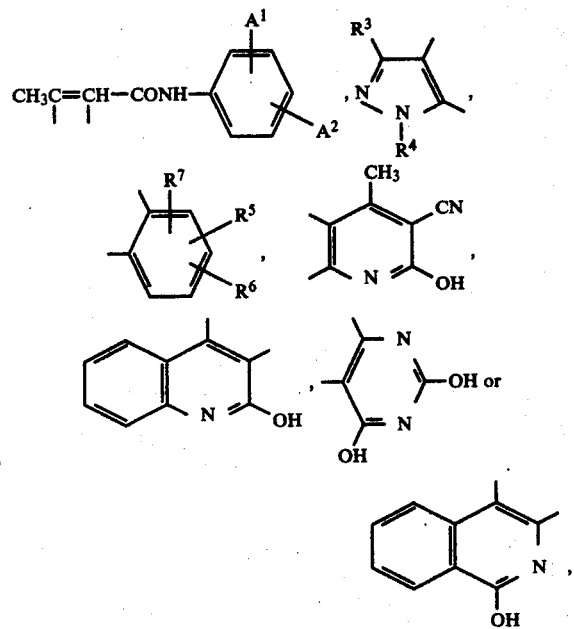

$R^3$ is hydrogen, methyl, phenyl or carbamoyl;

R⁴ is hydrogen, phenyl or phenyl bearing methyl, chloro or hydroxysulfonyl as a substituent;

R⁵ is methyl, methoxy, acetylamino, propionylamino, benzoylamino, N-phenylamino, dimethylamino or diethylamino;

R⁶ is hydrogen or methyl;

R⁷ is hydrogen or hydroxysulfonyl when R⁵ and R⁶ together form a fused benzene ring which may bear bromo, amino, hydroxy, phenylamino, acetylamino, propionylamino, benzoylamino or hydroxysulfonyl as a substituent;

Z is

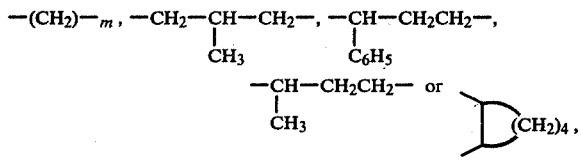

L is C₁ to C₆ alkyl, C₂ or C₃ hydroxyalkyl, β-cyanoethyl, C₁ to C₄ alkoxyethyl, C₁ to C₄ alkoxypropyl, phenoxyethyl, phenoxypropyl, benzoyloxyethyl, benzoyloxypropyl, phenylsulfonyloxyethyl, phenylsulfonyloxypropyl, tolylsulfonyloxyethyl, tolylsulfonyloxypropyl, cyclohexyl, benzyl, phenylethyl, phenyl or phenyl bearing chloro, bromo, methyl, ethyl, methoxy, ethoxy or hydroxysulfonyl as a substituent; and m is one of the integers 1, 2 and 3, n having the above meanings.

Examples of compounds of the formula H—A—NH₂ or

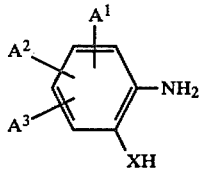

are: diazotizable amines of the benzene or naphthalene series which in the ortho-position to the amino group contain an alkoxy, hydroxy or carboxy group as a complex-forming substituent. Specific examples are 2-aminophenol, 4-chloro-2-aminophenol, 4-nitro-2-aminophenol, 5-nitro-2-aminophenol, 4,6-dichloro-2-aminophenol, 4,6-dinitro-2-aminophenol, 4-methyl-6-nitro-2-aminophenol, 4-chloro-5-nitro-2-aminoanisol, 4,5-dichloro-2-aminoanisol, 2-aminobenzoic acid, 4-nitro-2-aminobenzoic acid, 2-aminophenol-4-sulfonic acid, the amide, methylamide and phenylamide or 2-aminophenol-4-sulfonic acid, 4-chloro-2-aminophenol-6-sulfonic acid, the methylamide of 4-chloro-2-aminoanisol-5-sulfonic acid, 4-nitro-2-aminophenol-6-sulfonic acid, 6-nitro-2-aminophenol-4-sulfonic acid, 5-nitro-2-aminoanisol-4-sulfonic acid, 1-amino-2-naphthol-4-sulfonic acid, 1-amino-6-nitro-2-naphthol-4-sulfonic acid, 2-amino-1-naphthol-5-sulfonic acid, 2-aminobenzoic acid-4-sulfonic acid and 2-aminobenzoic acid-5-sulfonic acid.

Examples of compounds of the formula H—B—H or H—K—YH are: coupling components of the benzene, naphthalene, pyrazole, pyridine, quinoline, isoquinoline and pyrimidine series containing hydroxy groups or amino groups and also derivatives of 1,3-dicarbonyl compounds. Specific examples are 4-methylphenol, 3,4-dimethylphenol, 4-acetylaminophenol, 4-methyl-3-acetylaminophenol, 3-diethylaminophenol, 4-methyl-3-ethylaminophenol, 3-(o-tolylamino)-phenyl, 2-naphthylamine, 2-naphthol, 6-bromo-2-naphthol, 5,8-dichloro-1-naphthol, 1-naphthol-5-sulfonic acid, 2-naphthol-6-sulfonic acid, 1-naphthylamine-4-sulfonic acid, 1-naphthylamino-5-sulfonic acid, 2-naphthylamine-5-sulfonic acid, 2-naphthylamine-6-sulfonic acid, 8-acetylamino-1-naphthol-5-sulfonic acid, 6-phenylamino-1-naphthol-3-sulfonic acid, 7-amino-1-naphthol-3-sulfonic acid, 3-methyl-5-pyrazolone, 1-phenyl-3-methyl-5-pyrazolone, 1,3-diphenyl-5-pyrazolone, 1-phenyl-3-carboethoxy-5-pyrazolone, 1-(2'-methylphenyl)-3-methyl-5-pyrazolone, 1-(4'-chlorophenyl)-3-methyl-5-pyrazolone, 1-(2',5'-dichlorophenyl)-3-methyl-5-pyrazolone, 1-phenyl-3-methyl-5-pyrazolone-4'-carboxylic acid, 1-phenyl-3-methyl-5-pyrazolone-3'-sulfonic acid, 1-phenyl-3-methyl-5-pyrazolone-4'-sulfonic acid, 1,3-diphenyl-5-pyrazolone-2'-sulfonic acid, 1-(2'-chlorophenyl)-3-methyl-5-pyrazolone-5'-sulfonic acid, 2,4-dihydroxyquinoline, N-acetoacetylcyclohexylamide, N-acetoacetylphenylamide, N-acetoacetyl-(2-chlorophenyl)-amide or N-acetoacetyl-(4-methylphenyl)-amide-2-sulfonic acid.

Examples of compounds of the formula H—B—CHO or

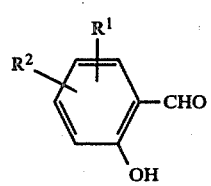

are: o-hydroxyaldehydes of the benzene or naphthalene series such as 2-hydroxybenzaldehyde, 2-hydroxy-1-naphthaldehyde, 3-nitro-2-hydroxybenzaldehyde, 5-nitro-2-hydroxybenzaldehyde, 5-bromo-2-hydroxybenzaldehyde, 3,5-dinitro-2-hydroxybenzaldehyde, 3,5-dichloro-2-hydroxybenzaldehyde, 2-hydroxy-1-naphthaldehyde-3-carboxylic acid, 2-hydroxybenzaldehyde-5-sulfonic acid, 5-(2',5'-dichlorophenylazo)-2-hydroxybenzaldehyde, 5-(2'-methoxyphenylazo)-2-hydroxybenzaldehyde-5'-sulfonic acid or the methylamide thereof, 5-(2'-chlorophenylazo)-2-hydroxybenzaldehyde-5'-sulfonic acid and 5-phenylazo-2'-hydroxybenzaldehyde-4'-sulfonic acid.

Examples of compounds of the formula H—E—NH₂ or NH₂—Z—NH—L are: 1,2-diaminoethane, 1,2-diaminopropane, 1-methylamino-2-aminoethane, 1-(β-aminoethylamino)-2-aminoethane, 1-(β-hydroxyethylamino)-2-aminoethane, 1-phenylamino-2-aminoethane, 1-cyclohexylamino-3-aminopropane, 1-phenylamino-2-aminopropane, 1-phenylamino-3-aminopropane, 1-(4'-methylphenylamino)-3-aminopropane, 1-(4'-chlorophenylamino)-3-aminopropane and 1-phenylamino-3-aminopropane-4'-sulfonic acid.

The 1:2-chromium complexes are prepared in stages starting from the 1:1-chromium complexes of the azo compounds which are obtained by known methods.

The reaction of the 1:1-chromium complex with the azomethine compounds or their individual components is carried out in aqueous solution or suspension, with or without the addition of an organic solvent, for example an alcohol or carboxamide. The formation of the 1:2-complex compound takes place in a weakly acid to alkaline range preferably at a pH of from 6 to 9 and at an elevated temperature of for example 50° C. to boiling temperature.

The 1:2-complex formed is isolated by acidification, salting out with alkali metal salts or evaporation, complex salts which are soluble in water being obtained. To produce organophilic dyes which are insoluble in water the complexes are precipitated from aqueous solution with suitable nitrogenous bases which yield the cations.

The nitrogeneous bases used for the production of the said solvent dyes are long-chain alkylamines or cycloalkylamines preferably of from six to sixteen carbon atoms such as 2-ethylhexylamine, di-(2-ethylhexyl)-amine, 3-(2'-ethylhexoxy)-propylamine, dodecylamine, isotridecylamine, oleylamine, dicyclohexylamine, N,N'-diphenylguanidine, N,N'-di-(2-methylphenyl)-guanidine, phenylbiguanide, 4-chlorophenylbiguanide and (2-methylphenyl)-biguanide.

The dyes are suitable for dyeing or printing natural or synthetic nitrogenous materials such as wool, polyamide fibers, polyurethane fibers and also leather. Dyeings are obtained having high light fastness and very good wet fastness properties, examples of which are fastness to water, persipiration, sea water, washing and milling. The good levelness on wool and the clear shades obtainable with the dyes of the formula (I) should also be mentioned.

The dye salts with amine bases which are insoluble in water but soluble in organic solvents may be used for coloring organic liquids, resins, surface coatings, wood stains or ball point inks, for coloring anodized aluminum or as dope dyes for example for the production of colored cellulose ester or nylon fibers.

Particular industrial importance attaches to dyes of the formula (Ib):

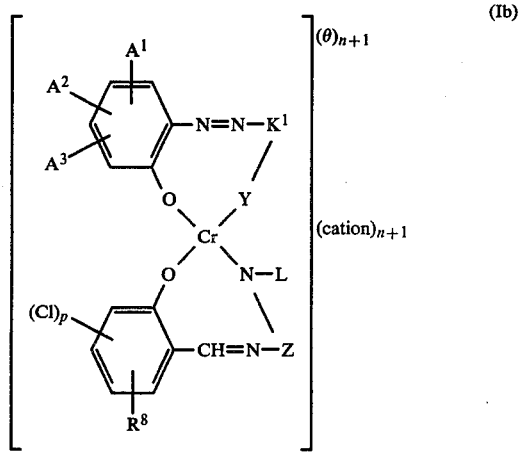

(Ib)

in which
R$^8$ is phenylazo or phenylazo bearing chloro, methyl, methoxy or hydroxysulfonyl as a substituent;
p is zero or one of the integers 1 and 2; and
K$^1$ is a radical of the formula:

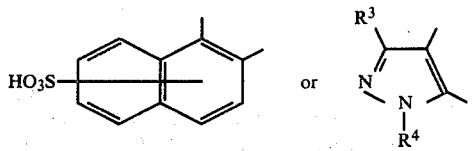

and A$^1$, A$^2$, A$^3$, L, N, Y, Z, R$^3$ and R$^4$ have the meanings given above.

R$^3$ is preferably methyl and R$^4$ is preferably phenyl or phenyl bearing methyl, chloro and/or hydroxysulfonyl as substituent(s).

Preferred meanings are:
A$^1$ hydroxysulfonyl, chloro or nitro;
A$^2$ hydrogen, chloro, nitro or hydroxysulfonyl;
A$^1$ and A$^3$ together may form a condensed benzene ring which may bear nitro as a substituent;
Z is

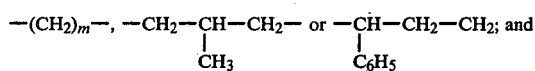

L is C$_1$ to C$_4$ alkyl, β-hydroxyethyl, β-hydroxypropyl, methoxyethyl, phenylsulfonyloxyethyl, tolylsulfonyloxyethyl, cyclohexyl, phenyl or phenyl bearing chloro, methyl, methoxy or hydroxysulfonyl as a substituent.

In the following Examples, which illustrate the invention, parts and percentages referred to are by weight unless otherwise stated.

EXAMPLE 1

A suspension of 15.3 parts of 5-phenylazo-2-hydroxybenzaldehyde-4'-sulfonic acid is heated with 5.6 parts of 1-(2'-hydroxyethylamino)-2-aminoethane for twenty minutes at 40° C. After 25 parts of the 1:1-chromium complex compound of the azo dye 5-nitro-2-aminophenol→2-aminonaphthalene-5-sulfonic acid has been added the whole is heated to 80° C. while stirring and a pH of 6.5 is set up with caustic soda solution.

When a thin layer chromatogram indicates the end of the formation of the 1:2-chromium complex compound the whole is diluted with 500 parts of water and the product is salted out with 200 parts of sodium chloride, suction filtered and dried.

48 parts of a dye is obtained whose complex anion has the formula:

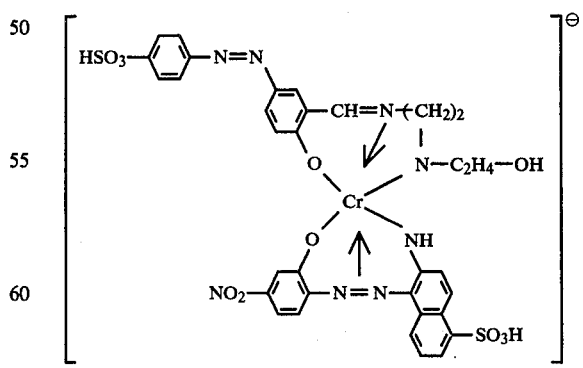

Green dyeings which exhibit very good light fastness and wet fastness properties are obtained on wool and synthetic polyamides.

The following dyes are obtained analogously:

| Example | 1:1-chromium complex of | azomethine | hue |
|---------|------------------------|------------|-----|
| 2 | azo dye: NO₂, OH, NH₂, N=N, SO₃H on naphthalene | CH₃, SO₃H, Cl, N=N, CH=N-(CH₂)₃, OH, HN-phenyl | green |
| 3 | " | HSO₃-phenyl-N=N-, CH=N-(CH₂)₃, OH, HN-phenyl-Cl | green |
| 4 | NO₂, OH, NH₂, NO₂, N=N, SO₃H on naphthalene | " | olive green |
| 5 | NO₂, OH, H₂N, HO₃S, HO, N=N, SO₃H on naphthalene | Cl, Cl-phenyl-N=N-, CH=N-(CH₂)₂, OH, HN-C₂H₅ | green |
| 6 | OH, SO₃H, HO, HSO₃, N=N on bis-naphthalene | " | bluish green |
| 7 | OH, HO, HSO₃, N=N, N-phenyl-SO₃H, CH₃, N on naphthalene-pyrazolone | " | red |
| 8 | OH, HO, CH₃, HSO₃, N=N, N-(o-tolyl), CH₃, N on naphthalene-pyrazolone | HSO₃, Cl, Cl, N=N, CH=N-(CH₂)₂, OH, HN-C₂H₄OH | red |
| 9 | OH, HO, HSO₃, NO₂, N=N on bis-naphthalene | HSO₃-naphthyl-N=N-, CH=N-(CH₂)₂, OH, HN-C₂H₄OH | olive green |

EXAMPLE 10

The 1:1-chromium complex compound obtained from 118.5 parts of the azo dye 1-amino-2-hydroxynaphthalene-4-sulfonic acid →1-hydroxynaphthalene-8-sulfonic acid is dissolved in 800 parts of water at 60° C. with the addition of caustic soda solution to form a neutral solution. After a solution of 39 parts of N-(γ-aminopropyl)-aniline in 18 parts of acetic acid and 80 parts of water has been added 30.8 parts of 2-hydroxybenzaldehyde is dripped in at 70° C. while stirring and a pH of 7.5 is maintained by adding caustic soda solution.

After formation of the 1:2-chromium complex compound is ended 120 parts of sodium chloride is added and the whole is allowed to cool, is suction filtered and dried. 211 parts of a dye is obtained which gives fast greenish blue dyeings on wool and synthetic polyamides. The complex anion of the dye has the formula:

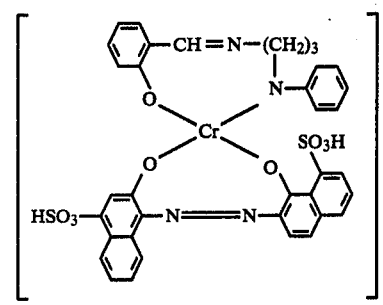

The following dyes are obtained analogously:

| Example | 1:1-chromium complex of | azomethine | Hue |
|---|---|---|---|
| 11 | | | greenish blue |
| 12 | | | bluish gray |
| 13 | | | bluish red |
| 14 | " | | bluish red |
| 15 | " | | bluish red |
| 16 | | | yellow |
| 17 | | | reddish orange |

We claim:
1. A dye of the formula

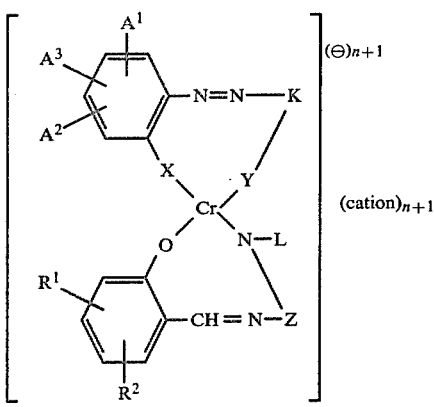

in which
A¹ is hydrogen, hydroxysulfonyl, chloro, bromo, methyl, methoxy, ethoxy, nitro, methylsulfonyl, ethylsulfonyl, sulfamoyl, sulfamoyl having one or two $C_1$ to $C_4$ alkyl substituents on nitrogen, or N-phenylsulfamoyl;

A² is hydrogen, chloro, nitro or hydroxysulfonyl;

A³ is hydrogen;

A¹ and A³ together form a fused benzene ring optionally bearing nitro as a substituent;

R¹ is hydrogen, chloro, bromo, nitro, hydroxysulfonyl, phenylazo, phenylazo substituted by chloro, bromo, methyl, methoxy, ethoxy, nitro or hydroxysulfonyl or naphthylazo substituted by hydroxysulfonyl;

R² is hydrogen, chloro, bromo or nitro;

R¹ and R² together form a fused benzene ring;

X is —O— or —COO—;

Y is —O— or —NH—;

K is

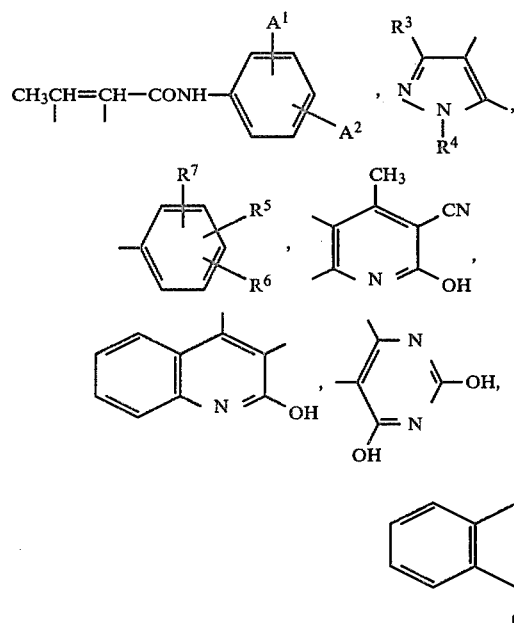

R³ is hydrogen, methyl, phenyl or carbamoyl;
R⁴ is hydrogen, phenyl or phenyl substituted by methyl, chloro or hydroxysulfonyl;

R⁵ is methyl, methoxy, acetylamino, propionylamino, benzoylamino, N-phenylamino, dimethylamino or diethylamino;

R⁶ is hydrogen or methyl;

R⁷ is hydrogen or

R⁵ and R⁶ together represent a fused benzene ring or a fused benzene ring substituted by bromo, amino, hydroxy, phenylamino, acetylamino, propionylamino, benzoylamino or hydroxysulfonyl, and R⁷ is hydroxysulfonyl;

Z is $$-(CH_2)-_m, -CH_2-\underset{CH_3}{CH}-CH_2-, -\underset{C_6H_5}{CH}-CH_2CH_2-,$$

$$-\underset{CH_3}{CH}-CH_2CH_2- \text{ or } \left\langle\!\!\!\begin{array}{c}\\ \end{array}\!\!\!(CH_2)_4\right.,$$

L is $C_1$ to $C_6$ alkyl, $C_2$ or $C_3$ hydroxyalkyl, β-cyanoethyl, $C_1$ to $C_4$ alkoxyethyl, $C_1$ to $C_4$ alkoxypropyl, phenoxyethyl, phenoxypropyl, $C_2$ to $C_4$ alkanoylethyl, $C_2$ to $C_4$ alkanoylpropyl, benzoyloxyethyl, benzoyloxypropyl, phenylsulfonyloxyethyl, phenylsulfonyloxypropyl, tolylsulfonyloxyethyl, tolylsulfonyloxypropyl, cyclohexyl, benzyl, phenylethyl, phenyl or phenyl bearing chloro, bromo, methyl, ethyl, methoxy, ethoxy or hydroxysulfonyl as a substituent;

m is one of the integers 1, 2 and 3; and n is the total number of the sulfonic acid groups and of the carboxyl groups which do not participate in the formation of the complex, with the proviso that the number of said sulfonic acid groups is not greater than 2.

2. A dye as claimed in claim 1 and having the formula:

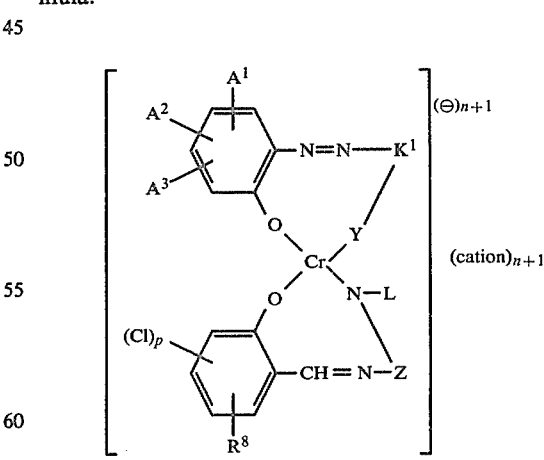

in which
R⁸ is phenylazo or phenylazo substituted by chloro, methyl, methoxy or hydroxysulfonyl;
p is zero, 1 or 2; and
K¹ is

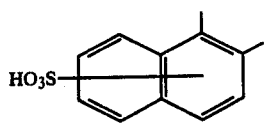 or 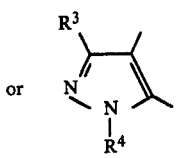
$A^1$, $A^2$, $A^3$, L, n, Y, Z, $R^3$ and $R^4$ having the meanings given in claim 1.
3. A dye as claimed in claim 1 having the anionic formula
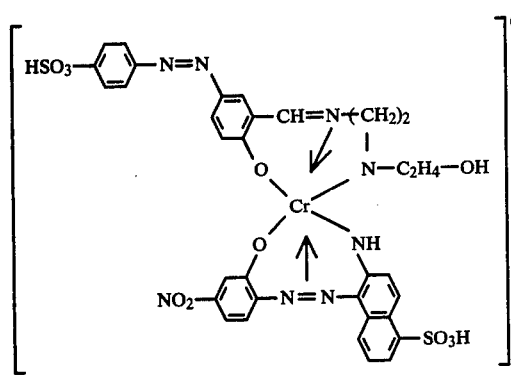
4. A dye as claimed in claim 1 having the anionic formula
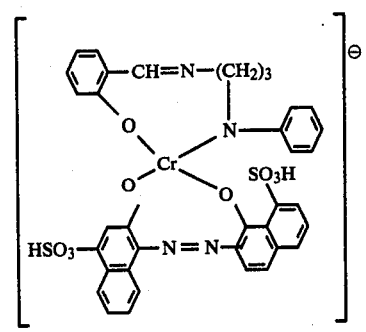
5. A dye as claimed in claim 1 having the anionic formula
* * * * *

UNITED STATES PATENT AND TRADEMARK OFFICE
CERTIFICATE OF CORRECTION

PATENT NO. : 4,212,801
DATED : July 15, 1980
INVENTOR(S) : Hans Baumann

It is certified that error appears in the above—identified patent and that said Letters Patent is hereby corrected as shown below:

First page, in the Abstract, in the formula after "(cation)" "n-1" should read --n+1--.

Column 1, line 15, in the formula after "(cation)","n-1" should read --n+1--.

Signed and Sealed this

Thirtieth Day of December 1980

[SEAL]

Attest:

Attesting Officer

SIDNEY A. DIAMOND

Commissioner of Patents and Trademarks